J. M. LEE AND H. G. HALVERSON.
TRUCK SUPPORT FOR IMPLEMENT TONGUES.
APPLICATION FILED MAY 3, 1918.
1,303,075.
Patented May 6, 1919.
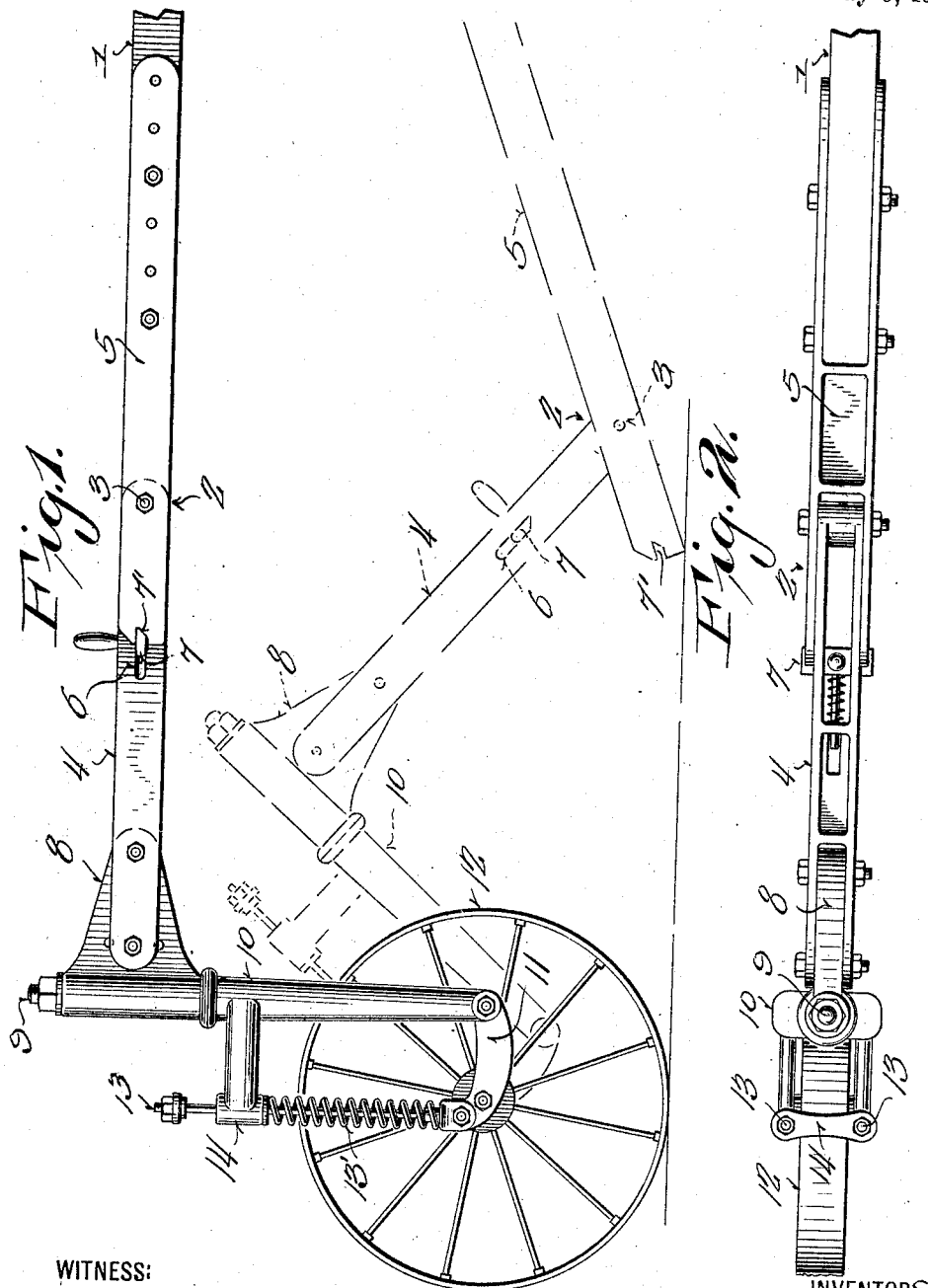
WITNESS:
J. P. Britt
INVENTORS
Jacob M. Lee
Halick G. Halverson
BY
Geo. Young
ATTORNEY

UNITED STATES PATENT OFFICE.

JACOB M. LEE AND HELLICK G. HALVERSON, OF STOUGHTON, WISCONSIN.

TRUCK-SUPPORT FOR IMPLEMENT-TONGUES.

1,303,075.             Specification of Letters Patent.      Patented May 6, 1919.

Application filed May 3, 1918. Serial No. 232,287.

*To all whom it may concern:*

Be it known that we, JACOB M. LEE and HELLICK G. HALVERSON, a subject of the King of Norway and a citizen of the United States, respectively, and residents of Stoughton, in the county of Dane and State and Wisconsin, have invented certain new and useful Improvements in Truck-Supports for Implement-Tongues; and we do hereby declare that the following is a full, clear, and exact description thereof.

This invention refers to truck supports for farm implement tongues and is especially adapted for use in connection with mowers where a great proportion of the weight of the machine is thrown upon the neck yoke of the horses by the tongue. It is therefore an object of the present invention to provide a simple, economical and durable support which being adjustable is readily attachable to any tongue.

Another object of the invention is to provide a tongue support which will properly track as the tongue is swung in any direction and is adapted to permit lowering of the same when desired.

The invention in one practical form in which it may be embodied is illustrated in the accompanying drawing, in which:—

Figure 1 is an elevational view of the invention showing in dotted lines the broken position, and Fig. 2 is a plan view of the invention.

Referring now more particularly to the drawing 2 designates a breakable tongue extension adapted to be secured to the ordinary tongue 1 of a farm implement. Centrally of the extension the same is provided with a joint 3 at which point the wheel supporting arm 4 of the extension meshes into bifurcated ends of the attaching arm 5. Mounted in slots 6 of the arm 4 is a spring dog 7 which engages notches 7' formed in the bifurcated ends of the attaching arm.

Under certain conditions such as harnessing the horses to the mower or unhitching the same it is desirous to lower the tongue; this is accomplished by drawing the spring dog out of engagement with the notched ends of the arm 5 whereupon the extension will be free to break at the joint 3 permitting the tongue to rest upon the ground as shown in dotted lines in Fig. 1.

Secured to the outer end of the tongue extension is a bracket 8 forming a bearing for the spindle 9 of a fork 10. In some instances it is found that the tongue extends from the mower at slightly varying angles therefore in order to maintain the fork 10 in a vertical position at all times a series of holes are provided in the bracket 8 which will permit the necessary adjustment of this member.

Pivotally secured to the fork at its lower ends are links 11 which form bearings for the axle of a wheel 12. The opposite ends of the links 11 have secured thereto rods 13 extending upwardly through guides 14 formed integrally with the fork member 10. Carried upon the rods 13 and abutting the guides are springs 13' which form a resilient suspension for the wheel carrying fork.

While we have shown this form of spring suspension it will be readily appreciated that any resilient suspension for the support which will relieve sudden jar or strain upon the tongue can be utilized without departing from the spirit of the invention.

What we claim as new is:—

1. A tongue supporting attachment including a breakable tongue extension comprising pivotally connected inner and outer sections, means for holding said sections against pivotal movement, and a supporting wheel carried by the outer section.

2. A tongue supporting attachment including pivotally connected inner and outer sections, a supporting wheel standard pivoted to the outer section, means for adjustably holding said standard against pivotal movement, and a wheel on said standard.

3. A tongue supporting attachment including an inner section having both ends bifurcated, the furcations of one end being adapted to receive the end of a tongue, an outer section disposed between the furcations of the other end of the first named section and pivotally secured thereto, a locking bar passed through the outer section and slidable longitudinally thereof and engageable with the adjacent furcations of the first named section for locking said sections against pivotal movement, and a supporting wheel carried by the outer section.

4. A tongue supporting attachment including a tongue section, a wheel standard pivotally secured to the tongue section, means for adjustably holding the wheel standard against pivotal movement, and a wheel resiliently carried by the standard.

5. A tongue supporting attachment including a tongue section, a wheel standard pivotally secured to the tongue sections, means for adjustably holding the wheel standard against pivotal movement, a lateral arm pivoted to the standard and resiliently held against pivotal movement with respect thereto, and a supporting wheel carried by the arm.

6. A tongue supporting attachment including a tongue section having one end bifurcated, a journal collar, a wing extending from one side of the journal collar and disposed between the furcations of the tongue sections and pivoted at its free end portions to the inner end portions of the furcations, the wing being provided with a series of apertures in its portion adjacent the outer ends of the furcations, an adjusting bolt passed through the outer ends of the furcations and selectively through one of the apertures, a standard journaled in the collar, and a wheel carried by the standard.

In testimony that we claim the foregoing we have hereunto set our hands at Stoughton, in the county of Dane and State of Wisconsin.

JACOB M. LEE.
HELLICK G. HALVERSON.

Copies of this patent may be obtained for five cents each, by addressing the "Commissioner of Patents, Washington, D. C."